United States Patent
Chen et al.

(10) Patent No.: US 8,311,308 B2
(45) Date of Patent: Nov. 13, 2012

(54) STENT VIEWING USING A LEARNING BASED CLASSIFIER IN MEDICAL IMAGING

(75) Inventors: Terrence Chen, Princeton, NJ (US);
Xiaoguang Lu, West Windsor, NJ (US);
Thomas Pohl, Marloffstein (DE); Peter Durlak, Erlangen (DE); Dorin Comaniciu, Princeton Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 220 days.

(21) Appl. No.: 12/960,625

(22) Filed: Dec. 6, 2010

(65) Prior Publication Data
US 2011/0142318 A1 Jun. 16, 2011

Related U.S. Application Data

(60) Provisional application No. 61/285,224, filed on Dec. 10, 2009.

(51) Int. Cl.
*G06K 9/00* (2006.01)
*A61B 6/02* (2006.01)
(52) U.S. Cl. ............................ 382/131; 382/274; 378/42
(58) Field of Classification Search .................. 382/100, 382/103, 128, 129, 130, 131, 132, 133, 134, 382/162, 168, 170, 173, 181, 209, 219, 232, 382/254, 274, 276, 291, 294, 305, 312; 606/32; 600/476; 250/370.09; 378/42
See application file for complete search history.

(56) References Cited

U.S. PATENT DOCUMENTS

| | | | | |
|---|---|---|---|---|
| 7,755,058 | B2* | 7/2010 | Maschke | 250/370.09 |
| 8,000,507 | B2* | 8/2011 | Rongen et al. | 382/128 |
| 8,160,680 | B2* | 4/2012 | Boyden et al. | 600/476 |
| 8,170,317 | B2* | 5/2012 | Movassaghi | 382/131 |
| 8,180,436 | B2* | 5/2012 | Boyden et al. | 600/476 |
| 8,241,274 | B2* | 8/2012 | Keogh et al. | 606/32 |

OTHER PUBLICATIONS

American Heart Association (AHA), "Heart disease and stroke statistics—2009 update," 2009.
A. Barbu, V. Athitsos, B. Georgescu, S. Boehm, P. Durlak, and D. Comaniciu, "Hierarchical learning of curves application to guidewire localization in fluoroscopy", CVPR 2007.
O. Bertrand, R. De Larochellire, M. Joyal, R. Bonan, R. Mongrain, and J. Tardif, "Incidence of stent under-deployment as a cause of in-stent restenosis in long stents.," International Journal of Cardiovasc Imaging, vol. 20, No. 4, pp. 279-284, 2004.
Y. Boykov and M. Jolly, "Interactive graph cuts for optimal boundary and region segmentation of objects in n-d images", ICCV, 2001.

(Continued)

*Primary Examiner* — Seyed Azarian (57) ABSTRACT

Stent viewing is provided in medical imaging. Stent images are provided with minimal or no user input of spatial locations. Images showing contrast agent are distinguished from other images in a sequence. After aligning non-contrast images, the images are compounded to enhance the stent. The contrast agent images are used to identify the vessel. A contrast agent image is aligned with the enhanced stent or other image to determine the relative vessel location. An indication of the vessel wall may be displayed in an image also showing the stent. A preview images may be output. A guide wire may be used to detect the center line for vessel identification. Various detections are performed using a machine-trained classifier or classifiers.

19 Claims, 6 Drawing Sheets

OTHER PUBLICATIONS

R. A. Close, C. K. Abbey, and J. S. Whiting, "Improved image guidance of coronary stent deployment," Proc. SPIE, vol. 3976, pp. 301-304, Apr. 2000.

W. T. Freeman and E. H. Adelson, "The Design and Use of Steerable Filters", PAMI 1991.

Y. Freund, and R. E. Schapire, "A decision-theoretic generalization of on-line learning and an application to boosting," in European Conference on Computational Learning Theory, 1995.

X. Lu, B. Georgescu, and D. Comaniciu, "Discriminative Joint Context for Automatic Landmark Set Detection from a Single Cardiac MR Long Axis Slice," Proc. FIMH, LNCS 5528, pp. 457-465, Nice, France, Jun. 2009.

J.M. Mishell, K.T. Vakharia, T.A. Portset, Y. Yeghiazarians, and A.D. Michaels, "Determination of Adequate Coronary Stent Expansion Using StentBoost, a Novel Fluoroscopic Image Processing Technique," Catheterization and Cardiovascular Interventions, vol. 69, pp. 84-93, 2007.

J. Ross, D. Langan, R. Manjeshwar, J. Kaufhold, J. Manak, and D. Wilson, "Registration and integration for fluoroscopy device enhancement.," Proc. MICCAI, vol. 8, No. 1, pp. 851-858, 2005.

G. Schoonenberg, P. Lelong, R. Florent, O. Wink, and B. Romeny, "The Effect of Automated Marker Detection on in Vivo Volumetric Stent Reconstruction," Proc. MICCAI, LNCS 5242, pp. 87-94, 2008.

U. Sigwart, J. Puel, V. Mirkovitch, F. Joffre, and L. Kappenberger, "Intravascular stents to prevent occlusion and restenosis after transluminal angioplasty," New England Journal of Medicine, vol. 316, pp. 701-706, 1987.

Z. Tu, "Probabilistic Boosting-Tree: Learning Discriminative Models for Classification, Recognition, and Clustering", Proc. International Conference on Computer Vision, pp. 1589-1596, 2005.

P. Viola and M. Jones, "Rapid Object Detection using a Boosted Cascade of Simple Features", IEEE Conf. Computer Vision and Pattern Recognition, 2001.

P. Viola and M. J. Jones, "Robust Real-Time Face Detection," International Journal of Computer Vision, vol. 57, No. 2, pp. 137-154, 2004.

Y. Zheng, A. Barbu, B. Georgescu, M. Scheuering, and ,D. Comaniciu, "Fast Automatic Heart Chamber Segmentation from 3D CT Data Using Marginal Space Learning and Steerable Features", Proc. International Conference on Computer Vision, 2007.

Y. Zhu, S. Prummer, T. Chen, M. Ostermeier, D. Comaniciu, "Coronary DSA: Enhancing coronary tree visibility through discriminative learning and robust motion estimation", SPIE 2009.

V. Bismuth and R. Vaillant, "Elastic registration for stent enhancement in X-ray image sequences," Proc. International Conference on Image Processing, pp. 2400-2403, 2008.

E. Dubois, S. Sabri, "Noise Reduction in Image Sequences Using Motion-Compensated Temporal Filtering," IEEE Trans. Communications, vol. 32, No. 7, pp. 826-831, 1984.

B. Georgescu, X. Zhou, D. Comaniciu, and A. Gupta, "Database-guided segmentation of anatomical structures with complex appearance," Proc IEEE Conference on Computer Vision and Pattern Recognition, 2005.

I. Kompatsiaris, D. Tzovaras, V. Koutkias, and M. Strintzis, "Deformable Boundary Detection of Stents in Angiographic Images," IEEE Transactions on Medical Imaging, vol. 19, No. 6, pp. 652-662, Jun. 2000.

* cited by examiner

STENT VIEWING USING A LEARNING BASED CLASSIFIER IN MEDICAL IMAGING

RELATED APPLICATIONS

The present patent document claims the benefit of the filing date under 35 U.S.C. §119(e) of Provisional U.S. Patent Application Ser. No. 61/285,224, filed Dec. 10, 2009, which is hereby incorporated by reference.

BACKGROUND

The present embodiments relate to imaging a stent. In particular, images for implanting or viewing a cardiac stent are provided.

Coronary heart disease is the most common cause of death for men and women. To treat narrowing of the artery lumen due to accumulation of atheromatous plaques, a stent is implanted to expand and support the narrowing vessel. A stent is a fine mesh. A guide-wire is first introduced inside the artery. During implantation, the stent is supported by a balloon. An angioplasty balloon equipped with a stent is slid along the guide wire.

Stent deployment is monitored by X-ray fluoroscopy. Proper visualization of the stent, including the stent's location, surrounding tissue, and deployed geometry, is important to ensure the quality of stent expansion. However, some stents have less metal, so are less radiopaque. Drug eluting stents may also be less radiopaque than bare metal stents. Lower X-ray doses may be desired, but result in less image quality. As a result, stent visibility in X-ray images is challenging.

One technique for stent enhancement in X-ray fluoroscopy image sequences is based on motion compensated temporal integration of the stent images. To compensate for heart and/or breathing motion, image frames in an X-ray sequence are registered to align the stent. In order to assess the location of the stent, the angioplasty balloon is equipped with two heavily radiopaque markers. The motion of the stent is inferred from the motion of the highly contrasted balloon markers. Temporal averaging of all aligned images may allow preserving stent contrast in the image while suppressing the noise, leading to improved stent visibility. While the moving background in the registered image sequence is blurred, the stent is preserved.

BRIEF SUMMARY

By way of introduction, the preferred embodiments described below include methods, computer readable media and systems for stent viewing in medical imaging. Stent images are provided with minimal or no user input of spatial locations. Images showing contrast agent are distinguished from other images in a sequence. After aligning non-contrast images, the images are compounded to enhance the stent. The contrast agent images are used to identify the vessel. A contrast agent image is aligned with the enhanced stent or other image to determine the relative vessel location. An indication of the vessel wall may be displayed in an image also showing the stent. Various other work flow aspects and/or images are provided, such as preview images, using a guide wire to detect the center line for vessel identification, and using machine-trained classifier or classifiers.

In a first aspect, a method is provided for stent viewing in medical imaging. A first sub-set of frames of data representing contrast agents are identified from a plurality of frames of data. The frames of data represent a patient at different times during inflow of the contrast agent such that the first sub-set of the frames of data represent the contrast agent and a second sub-set of the frames of data are free of contrast agent. Markers for a stent are detected in at least some of the frames of data. A reference contrast frame of data is selected from the first sub-set of the frames of data. The reference contrast frame of data is selected as a function of detected markers for the stent. A vessel wall is detected in the reference contrast frame of data. The reference contrast frame of data is aligned with a stent output. An image representing the stent is output. The image includes a highlight of the vessel wall where the highlight is aligned with the stent based on the aligning.

In a second aspect, a non-transitory computer readable storage medium has stored therein data representing instructions executable by a programmed processor for stent viewing in medical imaging. The storage medium include instructions for identifying images representing contrast agents from a fluoroscopy imaging sequence, detecting a vessel wall from at least one of the identified images, and generating an image of a stent from the fluoroscopy imaging sequence with the vessel wall enhanced relative to background.

In a third aspect, a system is provided for stent viewing in medical imaging. A memory is operable to store data representing a vessel with contrast agent and a guide wire for a stent. A processor is configured to detect the vessel from the data, determine a center line for the vessel from the guide wire, locate a vessel boundary from the vessel and the centerline, and generate an image from the data, the image highlighting the vessel boundary. A display is operable to display the image.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Automatic stent enhancement and/or vessel segmentation uses learning-based classifiers for contrast agent, balloon marker, guide wire and/or vessel detection. An enhanced image of a stent in relation with the vessel border may be presented on an image or in a fluoroscopic sequence. The entire process of stent enhancement and/or vessel segmentation is performed without user interaction to indicate a spatial location or image (temporal location). Balloon marker detection is used to align the stent in each individual frame. Vessel segment and guide wire detection are used to segment the vessel border and present the vessel in relation with the enhanced stent when a contrast medium present.

The proposed algorithm automatically detects contrast medium when it presents, selects a reference contrast frame, and segments the vessel borders based, at least in part, on the reference contrast frame. As a result, the user only needs to activate the algorithm, acquire a fluoroscopic sequence (e.g., around 30~50 frames), and inject contrast medium during the acquisition. The algorithm then automatically presents the user an enhanced stent, as well as overlays the vessel border with the enhanced stent or contrast image. The enhanced stent and vessel border may be presented to the user together in one image or separately in adjacent (time or space) images. A physician can then visualize much more clearly whether the stent is deployed or broken and how the stent position relates to the vessel walls. This application provides the physicians valuable information during or after interventional operations with little extra demands of the user.

Figure 1:
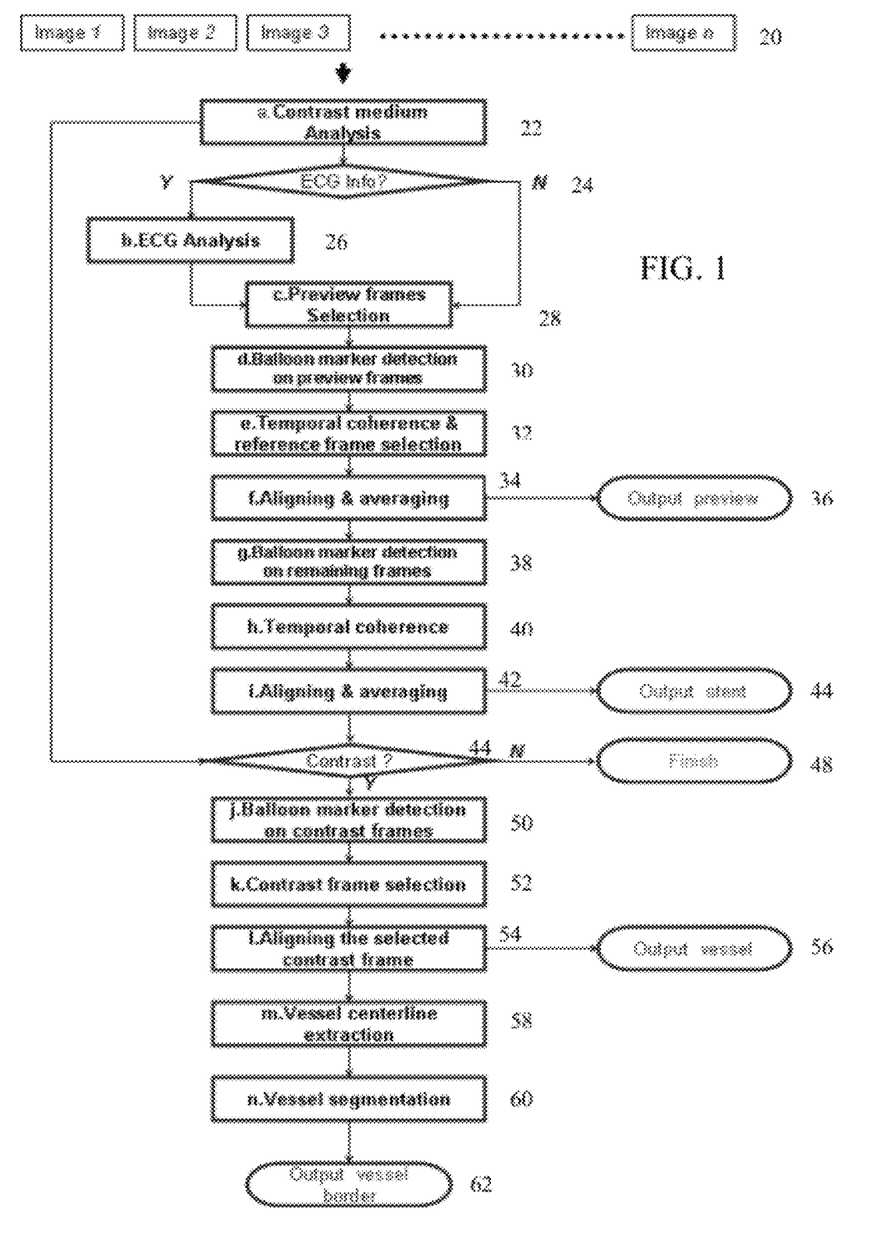
FIG. 1 is a flow chart diagram of an embodiment of a method for stent viewing in medical imaging.

FIG. 1 shows a method for stent enhancement in medical imaging. The method is implemented by a medical diagnostic imaging system (e.g., a fluoroscopy system), a review station, a workstation, a computer, a PACS station, a server, combinations thereof, or other device for image processing medical data. For example, the system or computer readable media shown in FIG. 11 implements the method, but other systems may be used.

The method is implemented in the order shown or a different order. For example, the images may be output in other orders, such as outputting with the vessel border in act 62 prior to the stent image in act 44.

Additional, different, or fewer acts may be performed. For example, acts 24 and 26 are not provided. As another example, acts 28-36 are not provided.

The acts are performed in real-time, such as during scanning. The user may view images of acts 36, 44, 56, and/or 62 while scanning to acquire additional images. Alternatively, the images are associated with previously acquired scanning or are provided after scanning.

The algorithm automatically localizes the balloon markers in each individual frame, aggregates the information and aligns multiple frames to generate an enhanced stent image. In addition, the proposed algorithm automatically detects contrast inflow, selects one suitable frame with filled contrast medium, and aligns the selected frame with the enhanced stent image. The vessel border in the area close to the stent is segmented and highlighted on the image. The entire workflow is click-free and without any user interaction other than activation. Any number of output images may be generated, such as four outputs: a preview image, an enhanced stent image, an aligned vessel image, and an aligned vessel image with border.

The workflow is implemented as a computer process. The computer process includes any number of modules, such as a different module for different sub-processes. For example, the workflow contains 14 modules (a, . . . , n) shown in FIG. 1. Alternatively, one or more modules may use the same process, so are reused. For example, balloon marker detection is used for d, g, and j; temporal coherence and frame selection is used for e and h; and registration and combination is used for f and i, resulting in ten modules. Other combinations may be used. The same module is used at different times or for different data. The module may include different rules, classifiers or processes for performing the same action but with different data.

In act 20, medical images are acquired. The medical images are displayed information or information for display. Information for display may be red, green, blue (RGB) type display values or may be scalar values prior to mapping for display. For example, the images are scalar values organized as frames of data. Each frame of data corresponds to a scan of a region. The frame of data is data that has been or has not yet been used to display an image. Image may be used to refer to data before or data used after actual display of an image based on the data.

An input sequence of any number (e.g., >30) of images is acquired, such as 30-50 fluoroscopic images. The images represent a region of the patient, such as a region including a stent, guide wire, and/or contrast agent. For example, the images include two balloon markers indicating the position of a stent. In one embodiment, the medical images are fluoroscopy images.

In act 22, images representing contrast agent are identified from the image sequence. The image sequence, such as a fluoroscopy imaging sequence, may or may not have frames of data representing contrast agent. For example, about half of the frames of the sequence include data responsive to contrast agents. The other images of the sequence represent the patient before and/or after the contrast agents are present, so are substantially free of information responsive to contrast agents. Being substantially free of such information may include some return by contrast agent, but not a sufficient amount to distinguish from noise, tissue or fluid. Each frame of data represents the patient at different times, such as the sequence of 50 images being acquired over a 3-40 second period. The sub-set of images responsive to contrast agent includes more or fewer images than the sub-set of images free of response from contrast agents.

Given an input sequence of frames $f_1, \ldots f_n$, where n is the total number of frames in the input sequence, a contrast inflow analysis is used to identify the images associated with contrast agents. This module finds the beginning frame of the contrast inflow and the frame with peak contrast inflow, but additional, different, or fewer frames may be identified.

An optional down sampling is performed. Each image is down sampled such that the size of the image, $f_i$, is equal to 128×128 for all frames i, $i \in \{1, \ldots, n\}$. Let $d_i$ denote the down sampled $f_i$. Other amounts of down sampling may be provided.

A classifier is applied to identify the images associated with contrast agents, such as a classifier to output information then used to determine whether contrast agent is represented. One simple approach may be summing the intensities for each image. The higher intensity may indicate the presence of contrast agents. Given noise and diaphragm motion, a more robust classifier may be used. Any image processing analysis may be provided, such as filtering using kernels meant to isolate vessel information and/or segmenting.

In one embodiment, the classifier for identifying contrast agent images is a machine-trained classifier. The machine-trained classifier is any one or more classifiers. The classifier may be a model or detector using imaging processing, filtering, or other techniques. A single class or binary classifier, collection of different classifiers, cascaded classifiers, hierarchal classifier, multi-class classifier, model-based classifier, classifier based on machine learning, or combinations thereof may be used. Multi-class classifiers include CART, K-nearest neighbors, neural network (e.g., multi-layer perceptron), mixture models, or others. A probabilistic boosting tree may be used. Error-correcting output code (ECOC) may be used.

The classifier is trained from a training data set using a computer. To prepare the set of training samples, vessels in a number of contrast filled images are manually annotated. The images are divided into local image patches containing vessels as the positive set of training samples and patches away from vessels as the negative training set. Any size patches may be used. The size of the patches may be determined by optimizing the machine-trained classifier. Any number of expert annotated sets of data is used. For example, 119,575 image patches of vessel segments and 172,544 image patches of background structures are collected from coronary images to train the classifier. Other numbers of training data images, positive cases, and negative cases may be used.

For learning-based approaches, the classifier is taught to distinguish based on features. For example, a probability model algorithm selectively combines features into a strong committee of weak learners based on Haar-like local rectangle filters. Haar features may be rapidly calculated using integral images. Additional or different features may be used. Features that are relevant to the structure of interest are extracted and learned in a machine algorithm based on the experts' annotations, resulting in a probabilistic model. A large pool of features may be extracted. The large pool is determined by a programmer or may include features systematically determined. The training determines the most determinative features for a given classification and discards non-determinative features.

Different combinations of features may be used for detecting different structures and/or the same structure at different resolutions or scale. For example, to detect vessel segments with different thicknesses, the contrast images are rescaled one or more times. A coarse-to-fine scale image pyramid is generated. The classifier is trained and applied to the images at different resolutions (i.e., scales). For example, one detector is applied to a coarse sampling of the data. Another detector is applied to a finer sampling of the data. More than two different samplings and associated detectors may be used, such as providing three or more different resolutions of data. For sequential sampling to provide data at different resolutions, the initial parameter space is partitioned into sub-spaces of increasing dimensionality, where the PBT classifiers are trained sequentially in each of these sub-spaces using bootstrap samples. A pyramid data structure is provided. The training sets are selected for the detectors at different levels depending on the complexity of the detection task. The same pyramid sequence is used during the detection process. The features are calculated from the data. The features are calculated from the data at different resolutions. The sets represent the same object in the same region. Features are calculated from a coarse set and then in a fine set of the pyramid. The machine learning may determine the determinative features. For each determinative feature, a data set at the corresponding resolution is provided. The classifier is trained on and applied to perform vessel segment detection at multiple scales.

At each scale, to further speed up vessel detection, the images before calculation of the features may be processed, such as filtered. For example, a set of steerable filters to find ridges or points along ridges as well as their different orientations are applied to the images at each scale. Each pixel is represented a float number between 0 and 1. 0 is not a ridge at all and 1 is a ridge. Any threshold or image analysis may be used to distinguish ridges from other structure. Points along a ridge are classified as being part of a vessel or not part of a vessel. Any sampling along ridges may be used.

In one embodiment, a discriminative learning technique facilitates contrast inflow detection. A vessel segment detector is implemented as a binary classifier that separates the class of vessel images from the class of non-vessel images. For example, a probabilistic boosting tree (PBT) algorithm is used to train the classifier. The PBT algorithm learns a binary decision tree, where each node (e.g., 31 nodes in five levels) of the tree is a binary classifier by itself and is learned through the Adaboost algorithm. Given an image patch $I_{patch}$, the PBT classifier calculates the posterior probability that a vessel segment appears in the patch P (vessell$_{Ipatch}$). Patches around different locations, such as each location or only ridge locations in a down sampled image, are used to detect any vessel for the location. To limit the number of patches, the learned PBT classifier is applied to each ridge point to compute the probability that the ridge point is from a vessel. A detected vessel region is defined as the image area where vessel segments are detected with high probabilities. The remaining area of the image contains primarily background structures and is defined as the background region.

The probabilistic boosting tree (PBT) unifies classification, recognition, and clustering into one treatment. The classifier is a tree-based structure with which the posterior probabilities of the presence of the structure of interest are calculated from given data. Each detector not only provides a binary decision for a given sample, but also a confidence value associated with the decision. The nodes in the tree are constructed by a combination of simple classifiers using boosting techniques.

The classifier is trained to output a score for a plurality of locations in each image. For example, a score is output for each of the locations in the down sampled images or for each ridge or other location. For all i, the trained vessel detector is applied to $d_i$ to obtain a score $s_{(x,y)}$ at each location (x, y) of $d_i$, where $s \in \{0, \ldots, 1\}$ represents the probability of pixel (x, y) being inside a vessel or not. The classifier outputs the probability as a likelihood, but may output a rank or other score based on the probability but without being an actual probability value (e.g., without being a percentage). The score (probability or other value) is based on whether the location is inside a vessel or not. For example, the machine trained-classifier outputs a binary score or a score with a greater dynamic range. The higher or lower values indicate the location is part of a vessel, in the vessel, or associated with the vessel, and the opposite value or values indicate that the location is background or not associated with the vessel.

Figure 2:
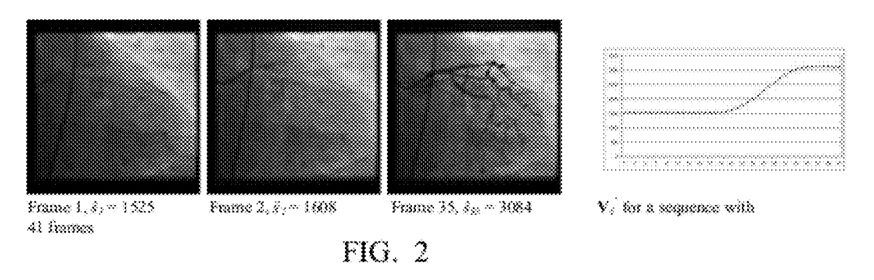
FIG. 2 shows example medical images associated with indication of likelihood of locations being part of a vessel.

FIG. 2 shows three example frames of data from a forty-one frame fluoroscopy sequence. These images are down sampled. Each pixel location is modulated as a function of the corresponding score. The output scores are within a range of values (e.g., 0-63 or 0-256) where scores indicating a greater chance of the location being in a vessel are mapped to darker gray scale values.

Figure 4:
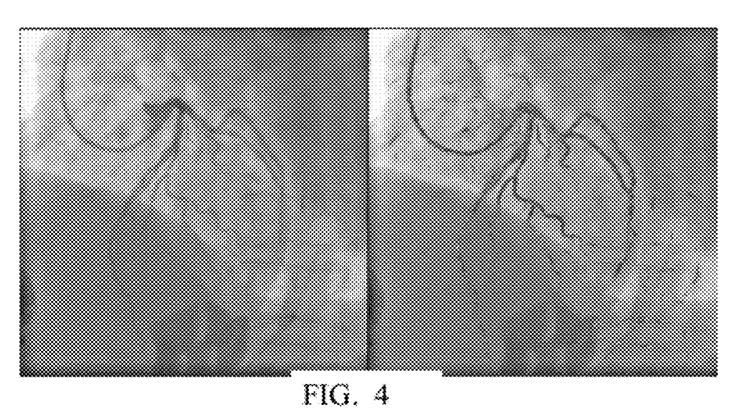
FIG. 4 shows example medical images resulting from vessel segment detector.

FIG. 4 shows another example output frame from the vessel detector with a corresponding input. The left image is of the input frame where contrast agent is present in the image, making the vessels appear darker. The vessels are detected and mapped to an even darker color as shown in the right image. The detected vessels are overlaid on the input image. The output of the vessel detector is just the black vessels with the rest being zero or background values. The darkness of the color shows the probability of the response.

Figure 5:
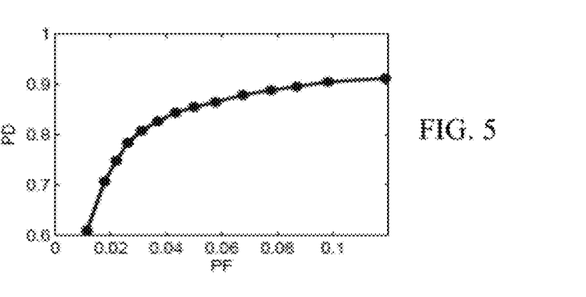
FIG. 5 shows an example performance curve for vessel segment detection.

FIG. 5 shows the receive operation characteristic of one learned vessel detector. 119,575 image patches of vessel segments and 172,544 image patches of background structures were collected from coronary images to train the PBT classifier. The vessel segment detector was tested on 367 images where the coronary vessels were manually annotated. The Receiver Operation Characteristics (ROC) in FIG. 5 shows the percentage of the vessel areas correctly detected (PD) versus the percentage of the background areas falsely labeled as vessels (PF). With learning-based vessel segment detection, vessels are roughly separated from background structures.

The output of the vessel detector is used to determine whether or not contrast agents are present in the image. The vessel detector is less likely to detect vessels where contrast agent is absent. The output of the vessel segment detector for each image is summed. The scores for each of the frames of data or images, down sampled or not, are added together. For example, let $\hat{s}=\Sigma s$ be the summation across all 128×128 pixel locations in $d_i$, where $\hat{s}_i$ is the score for frame i. FIG. 2 shows some example input or output frames and their corresponding $\hat{s}_i$ values.

The right most image in FIG. 2 shows a vector of $\hat{s}$ over the sequence of 41 frames. Let $V_{\hat{s}}$ be the vector of $\hat{s}$ over all frames, $V_{\hat{s}}=\{\hat{s}_1, \ldots, \hat{s}_n\}$. Optionally, the vector may be smoothed or otherwise filtered. For example, a Gaussian smoothing function, G, is applied to $V_{\hat{s}}$, providing $V_{\hat{s}}'=G(V_{\hat{s}})$.

The frames representing contrast agent may be determined from the score. The output images may be processed to identify vessels, such as applying region growing or steerable filtering to identify long, thin, branching structures. In another embodiment, the sum for each image is used. If the sum is greater than a threshold, the frame is associated with contrast agent.

One or more specific frames may alternatively or additionally be identified. For example, the frame with the most contrast agent is identified. The frame with the maximum contrast medium $f_M=\text{argmax}_i(V_{\hat{s}i}')$ (e.g., highest sum) is identified as the frame with the most contrast agent.

Other images may be identified, such as an image corresponding to a beginning of in-flow of contrast agents in the fluoroscopy sequence. The beginning may be absolute, such as the first frame with any contrast agent, or may be relative, such as one of the first five or other number of frames with contrast agent. As the contrast agent flows into the image region, more and more contrast agent will be detected. The first frame with contrast agents is detected as the frame having enough contrast agent to sufficiently allow distinction from tissue, stent, guide wire or other imaged structure. The right most graph of FIG. 2 shows the contrast agent being absent along the initial frames, but then in-flowing. The in-flow results in an upward ramp from steady state of no contrast agent to a steady state of contrast agent. The smoothing reduces high frequency variance, but more or less smoothing may be provided.

The beginning of contrast agent in-flow is determined from analyzing the vector $V_{\hat{s}}$. The steady state may be determined as an average of the sums for an initial number of frames. A threshold of deviation from the average may be used to identify the beginning of in-flow. More robust determination may be provided using correlation. A kernel representing typical, possible, or likely in-flow is provided, such as the example shown in FIG. 3. The kernel has a no contrast region and an in-flow region. The kernel represents the entire expected in-flow pattern or a portion of the expected in-flow pattern around the beginning.

Figure 3:
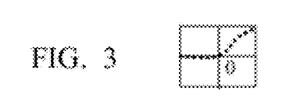
FIG. 3 is a graphical representation of an in-flow kernel according to one embodiment.

This kernel is correlated with a plot (e.g., $V_{\hat{s}}$) of the summed scores as shown in FIG. 2. The kernel and vector represent the aggregation of intensity from contrast agent as a function of relative time of the frames of data. Let K be a kernel designed as shown in FIG. 3. A new vector R is calculated where each of its $i^{th}$ component is the normalized correlation (NC) between K and a same size window centered at i in $V_{\hat{s}}'$, $R=\text{NC}(K, V_{\hat{s}}')$. The kernel has a location labeled as the beginning of in-flow, so that the position of the kernel best matching the vector $V_{\hat{s}}$ may be used to derive the beginning of in-flow. Alternatively, the beginning of in-flow is determined mathematically. Hence, the beginning frame of the contrast inflow $f_b=\text{argmax}_i(R_i)$. Let $I_A$ and $I_B$ be two signals, $$NC(I_A, I_B) = \frac{1/n \sum_i (I_{A_i} - \bar{I}_A)(I_{B_i} - \bar{I}_B)}{\sqrt{(1/n)\sum_i (I_{A_i} - \bar{I}_A)^2} \sqrt{(1/n)\sum_i (I_{B_i} - \bar{I}_B)^2}}.$$

In act 24, the availability of ECG information is determined. The ECG information may be used to select one or more images for output as a preview in act 36. This provides an initial indication to the user while the process to output the other images is on-going. Without ECG, act 26 is skipped and frames are selected in other ways.

Figure 6:
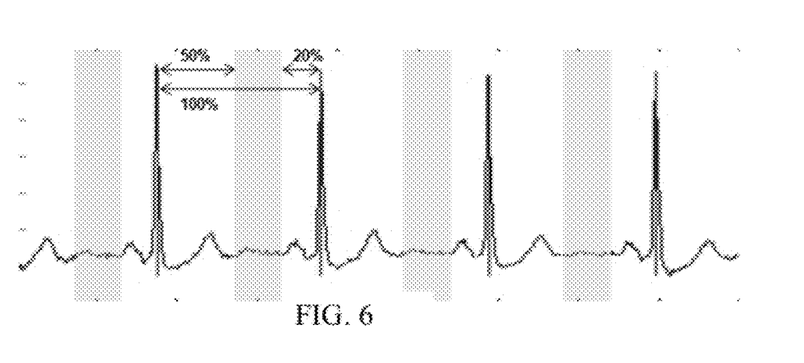
FIG. 6 is an example ECG plot showing possible time periods (shaded areas) of low motion.

In act 26, ECG information is obtained. FIG. 6 shows an ECG trace. A sub-set of the frames of data is selected using the ECG information. As the frames are acquired, a relative phase of the heart cycle is associated with each frame. For example, about forty frames are acquired during each heart cycle. The phase may be detected and the image labeled with the phase. Alternatively, the time of image acquisition is recorded and used for comparison against times represented by an acquired ECG trace.

In act 28, one or more frames are selected. Six, ten, or other numbers of frames are selected. For example, $p_j \in \{f_1, \ldots f_n\}$, $j=\{1, \ldots, 6\}$ or $\{1, \ldots 10\}$, are selected to generate a preview image. The preview image may be output more quickly than other images, such as outputting a stent enhanced image in less than 2 seconds.

For selecting the sub-set, the QRS peaks (vertical lines in FIG. 6) are detected. The frames to be used for the preview are selected to represent the patient during portions of the heart cycle with little motion. For example, the 5-10 frames in the 30% of the cycle indicated in FIG. 6 are used, but other numbers of frames and portions of the heart cycle may be used. The 30% may be determined from the R-R distance (time between R peaks). The R-R distance is assumed to be 100% of a given cycle. The 30% region of the R-R distance begins from the middle of the two QRS peaks. Other portions and percentages of the cycle may be used. All of the frames in the sub-set are selected or a certain number of frames in the sub-set are selected. For example, the initial six frames are selected from a sub-set representing a given percentage of one of the heart cycles are selected. The sub-set represents a low motion period. Output $P=\{p_1, \ldots, p_6\}$, $p_j \in L$, where L is the set of the least motion frames selected from the sub-set identified using ECG.

Depending on the speed of scanning, different numbers of frames may be included in the sub-set. Alternatively, the sub-set is selected to include only a certain number of frames. Limiting the number of frames may result in more rapid processing in acts 30, 32, and 34 to generate the preview image.

Where ECG information is not available, other selections of the preview images may be used. For example, the first ten or other number of frames are selected to generate the preview image. Output $P=\{p_1, \ldots, p_{10}\}$, $p_i=f_i$.

Acts 30, 32, and 34 are performed for the selected sub-set of frames. Acts 38, 40, and 42 are generally the same acts as 30, 32, and 34, but performed on a greater number (e.g., all or the sub-set of non-contrast frames) of the frames in the sequence. These sets of acts are performed in parallel or sequence. There may be other differences than the number of images processed, such as selection of a reference frame occurring in act 32 for use by other acts (e.g., act 54) and not occurring in act 40 or vice versa.

Figure 7:
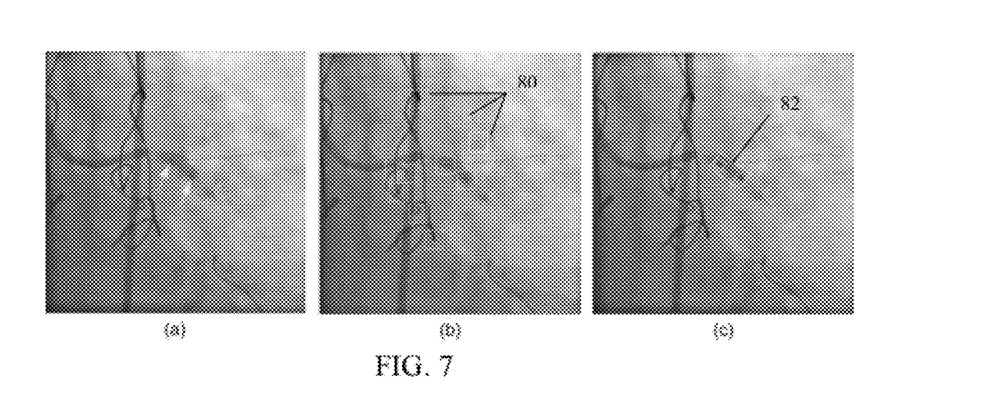
FIGS. 7a-c show medical images for a marker detection sequence in one example.

In acts 30, 38, and 50, markers for the stent are detected. The markers for the stent are on the stent or a related structure. The balloon for expanding the stent may have one or more markers for the stent. The guide wire or other structure associated with the stent may have one or more markers for the stent. Markers may be provided in any combination on one or more of these stent related structures. In one embodiment, two markers are provided on at different ends of the balloon. FIG. 7a includes two arrows showing a pair of balloon markers in a fluoroscope image. The markers are radiopaque in order to be viewed in x-ray images. By detecting the markers associated with the stent, such as on the balloon, markers for the stent are detected.

The markers are detected in one or more frames of data. For example, the balloon markers are detected in the reference frame of data. As another example, the balloon markers are detected in the selected preview frames of data in act 30, detected in the remaining frames of data without contrast agent in act 38, and detected in one or more contrast agent frames of data in act 50. The detection may be the same for each act or may be different.

Any now known or later developed marker detection may be used. In one embodiment, a probabilistic boosting tree is trained with Haar features as the input to identify possible markers individually. In other embodiments, a classifier is trained to detect expected combinations of markers, such as pairs of markers.

A hierarchal approach may be used, such as detecting possible markers individually and then detecting likely pairs from the detected individual possibilities. U.S. Published application Ser. No. 12/960,635, the disclosure of which is incorporated herein by reference, shows example embodiments of a hierarchal marker detection. The joint context may be used. FIG. 7b shows detection of possible individual markers in one frame of data using a PBT trained classifier. Marker candidates are individually detected by applying an individual marker detector. The squares 80 indicate possible markers. The whiter or brighter squares 80 indicate a greater confidence that the detected possible marker is actually a marker. The bluer or darker squares 80 indicate possible markers with less confidence. As shown in FIG. 7b, the top candidates (i.e., the strongest confidence) may not correspond to the correct markers due to limited discriminative power of individual marker detector in the presence of large inter-class similarities. The boxes reflect the context used for detection, but different context (region sizes) may be used for detection than reflected by the size of the boxes.

FIG. 7c represents a final detection. The pair of markers that have the best detection score after applying a joint detector for marker pair detection based on the candidates of (b) is identified. A separate or hierarchal classifier uses as inputs the candidates for the markers. Using Haar features, probabilities, and/or other features associated with the candidates, the classifier determines the pair or other expected combination with a greatest probability. In FIG. 7c, the squares are automatically detected marker locations. The rectangular box 82 represents the joint context constructed by a pair of markers.

In acts 32 and 40, temporal coherence is applied to remove outliers or other detected markers that may be inaccurate. After the detection of the balloon markers in each frame, the detected balloon marker locations in each frame are sorted by their associated detection probability. Let $M_i^n$ be the $i^{th}$ detected balloon marker position at frame n. $P(M_i^n)$ is the detection probability. The two balloon markers, $M_1^n$ and $M_2^n$, output from the joint detector are put on the top of the list.

Balloon markers may be removed based on static location. The location of the balloon marker detection may be attracted by the blob-like patterns on the static wire-like structure of the stent or guide wire. Since the ground truth guide wire with the stent is located inside a coronary artery, it is very unlikely that a balloon marker on the guide wire would stay in the same location across different frames. In order to minimize the possibility of such cases, the algorithm scans through all frames and remove locations detected in more than 30% of the frames. If the marker for a given frame is in the same location in more than 30% of the other frames (e.g., more than 30% of the preview frames in act 32 or more than all the non-contrast frames or all the sequence frames in act 38), then the markers in the frames with the common locations are removed. Other values than 30% may be used.

A marker reference frame of data is selected from the remaining frames of data. For act 32, the reference frame is selected from the preview subset, but may be selected from a larger set. For act 38, the reference frame from act 32 is used. Alternatively, a different or replacement reference frame is selected from the larger group of images.

The reference frame is selected based on a distance between markers in the frames of data and the probabilities of the markers in the frames being correct. The purpose is to identify one frame where the two balloon markers are correctly detected with the highest probability. For example, the probabilities of a joint pair of markers output by the classifier and the distance between the markers of the pair are used. $P_{bm}(i)$ is the probability of the first two balloon markers output from the joint detector being correct. The distance is represented by $d(i, j)=d_1(i, j)+d_2(i, j)$ where $d_1(i, j)=\min(|M_1^i-M_1^j|_{L^2}+|M_2^i-M_2^j|_{L^2}, |M_1^i-M_2^j|_{L^2}+|M_2^i-M_1^j|_{L^2})$ is the sum of distances between the corresponding balloon markers in frame i and j, and $d_2(i,j)=||M_1^i-M_2^i|_{L^2}-|M_1^j-M_2^j|_{L^2}|$ is the difference between the length of the two balloon markers. This distance is a correlation of one frame relative to another in order to indicate the marker frame most like other marker frames. A distance or length value alone may be used. Other functions for distance may be used.

These two variables are used together to select the reference frame. The values for the variables may be normalized and summed. The greatest sum, such as given by:

$$\text{Score}(i) = P_{bm}(i) \times \frac{1}{N-1} \sum_{j, j \neq i} \exp(-d(i, j)^2 / \sigma^2),$$

where N is the total number of frames, j is any frame other than i, and d(i, j) is defined as the distance between frame i and j, is used. Other functions with the same or different variables may be used. In alternative embodiments, the probability alone (e.g., pair of markers with the greatest probability) or distance alone is used to select the reference frame. The reference frame $r=\text{argmax}_i \text{Score}(i)$ is selected as the reference frame.

The reference frame is used to find the balloon markers in all the other frames. The correct balloon markers are to be identified in the other or remaining frames. The reference frame is used as a starting point in time. Frames from backwards and forwards in time from the reference frame r are examined. The balloon markers identified in the reference frame r are used to check the consistency in frames r+1, and r−1. If the distance d(r, r−1) is smaller than a threshold, the markers in the frame r−1 are added into the list of correct markers. If no balloon marker pairs are found in frame r−1, frame r−1 is skipped. The process repeats for other frames, (e.g., r+1, r−2, r+2, r−3 . . . ). The distance function is the one used for selecting the reference frame, but other distance functions may be used. The distance function is a cost function based on the consideration that the markers will not have moved much between frames. The frame with confirmed markers closest in time is used for the distance comparison, but the reference frame may be used for temporally spaced frames in other embodiments. All the frames with consistent balloon marker candidates are output.

Other approaches may be used. For example, temporal coherence is not performed. Instead, the frames with marker pairs with sufficient (e.g., above a threshold) probability are used. As another example, a range of likely motion of the markers is determined and correlated with the heart cycle. If the markers are within expected tolerance given the heart phase or motion, then the markers are considered correct.

In acts 34 and 42, a stent image is generated. In act 34, the stent image is formed from the preview set. In act 42, the stent image is formed from the non-contrast agent frames or all the frames including contrast agent frames. The frames used include only frames with markers identified as correct or likely correct. For example, only the frames with temporal coherence output from acts 32 and 40 are used.

Combination is used to form the stent image. Averaging or other combination results in maintaining the stent information while cancelling out more random background information. The stent is enhanced relative to the background.

For the stent to be enhanced, the frames of data are aligned. Where a pair of markers are used, the markers are aligned. Each of the images with correct markers are rotated, translated, and/or scaled relative to the reference frame. The rotation, translation, and/or scaling is to position the markers in the same locations. The transform may be rigid or non-rigid. Only rotation and/or translation may be used in other embodiments. Only scaling may be used in other embodiments. In one embodiment, the images are low pass filtered. The filtered images are scaled in a specific orientation. After scaling in the orientation, the scaled images are aligned.

By aligning the markers, the stents are more likely aligned. Since the position of the stent relative to the markers on the balloons or other marker locations is generally consistent, the data representing the stent aligns or is in phase. When the aligned frames are combined, this data sums to a greater level. Other locations likely do not sum to the same extent or are out of phase. For example, heart motion causes the tissue to move. This variance causes the average or sum to be less.

The combination in act 34 is the same or different than in act 42. A simple average may be used. A sum without normalization may be used. A weighted average may be used, such as with weights that more strongly weight frames associated with a higher probability of correct marker identification. The aligned and compounded frames of data from a stent frame of data.

In act 36, a preview image is output. The preview image is generated from a sub-set, such as the preview sub-set, selected in act 28. The preview image is a stent enhanced image, such as being from a combination of multiple images with the stent aligned. The stent frame of data is mapped to gray scale or color values for generating a displayed image. In alternative embodiments, the stent is enhanced by segmentation. An image process is applied to identify the stent. The borders of the stent are located. A graphic overlay of the borders and/or different display value mapping may be used to highlight the stent.

Figure 10:
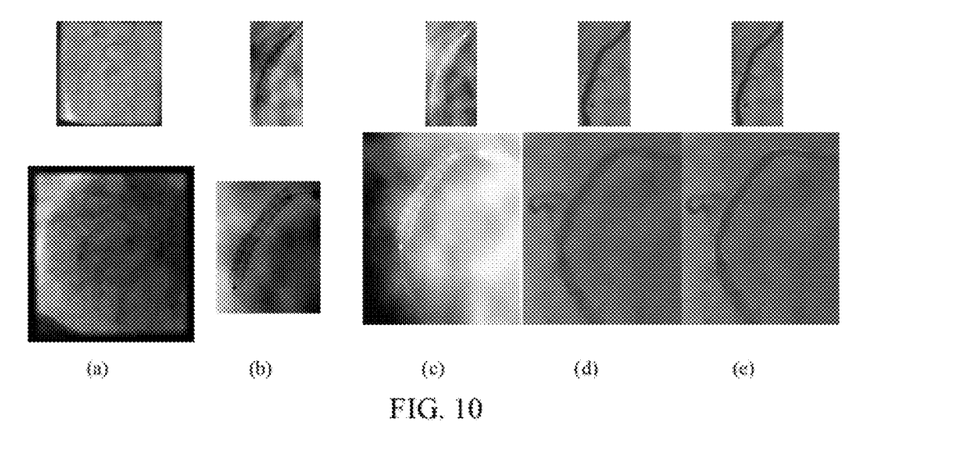
FIGS. 10a-e show example outputs of images according to one embodiment.

In act 44, the stent enhanced image is output. The stent frame of data formed by alignment and combination from all non-contrast frames with sufficient marker detection is used to generate an image. In alternative embodiments, contrast agent frames are used instead or in addition to the non-contrast agent frames. FIG. 10*b* represents an example stent image. FIG. 10*c* is an inverse mapping for the example stent image of FIG. 10*b*. FIG. 10*a* is the first image in the sequence. FIGS. 10*b* and 10*c* show the stent enhanced as compared to FIG. 10*a*.

In act 46, the process either finishes or continues depending on whether there are contrast frames. If no contrast frames were identified in act 22, then the process moves to act 48 and is complete.

If there are contrast frames, then the process continues. The contrast frames are used to find vessel information for output in an image. For example, vessel borders are highlighted in an image.

In act 50, markers are detected in the contrast frames. The markers are detected as discussed above for acts 30 and 38, but different approaches may be used. In one embodiment, the same classifier identifies individual markers and then marker pairs in non-contrast and contrast frames. In another embodiment, two classifiers are trained in the same way, but using different training data. One classifier is for contrast agent frames, and the other is for frames without contrast agents.

In act 52, a reference contrast frame of data is selected. The reference is selected from a sub-set of the frames of data. The sub-set includes the contrast agent frames determined in act 22.

Any approach may be used to select the reference contrast frame of data. For example, the frame with the highest contrast agent probability or sum from act 22 is selected. As another example, a frame correlated in time with a portion of the in-flow plot is selected, such as one of the first frames after reaching a contrast agent steady state.

In one embodiment, the reference contrast frame of data is selected as a function of detected markers for the stent. The total number of frames of the input sequence is n, and the number of non-filled (i.e., non-contrast agent) frames is m, where $m \leq n$. The frame with maximum contrast medium identified in act 22 is used to start the analysis. If other frames are used to start this process, then the maximum determination in act 22 may be avoided. Starting with the maximum frame, the contrast agent or filled frames are progressively analyzed through to the beginning and ending of the contrast frames.

The goal is to find a frame i with as much contrast as possible but also with balloon markers that are correctly detectable. For example, let the markers $M_1^r=(x_1^r, y_1^r)$ and $M_2^r=(x_2^r,y_2^r)$ be the two balloon markers on the reference frame identified from the non-contrast frame in act 32. $M_1^c=(x_1^c,y_1^c)$ and $M_2^c=(x_2^c,y_2^c)$ are the two balloon markers on the current selected contrast frame (i.e., frame to be analyzed).

A bounding box is created around each marker based on a Gaussian curve. The detected marker location is considered the highest probability location, so the Gaussian is centered at that location. The probability for the marker to be at adjacent locations has decreasing probability based on the Gaussian. For example, $M_1^r \subset B(M_1)$, where $M_1$ is the set of the 1$^{st}$ balloon markers in the non-contrast frames, $B(\cdot)$ is the bounding box created by the maximal and minimal x and y positions from $M_1$. $M_2^r \subset B(M_2)$, where $M_2$ is the set of the 1$^{st}$ balloon markers in the non-contrast frames, $B(\cdot)$ is the bounding box created by the maximal and minimal x and y positions from $M_2$. The bounding boxes are to be used for determining the amount of contrast agents.

The difference in distances between the markers should be within a threshold of the distance in the non-contrast reference frame. $|M_1-M_2|<\max_i|M_1^i-M_2^i|$, where i is the index of a non-contrast frame, $i\in\{1,\ldots,m\}$.

The direction of a line formed by the two markers in the image may be considered. The direction or orientation should be similar to the non-contrast reference frame. $\theta(\vec{V}^c, \vec{V}^r) \leq \max_i \theta(\vec{V}^i, \vec{V}^r)$, where $\vec{V}^i$ is the vector in frame i obtained by $M_2^i-M_2^i$.

The contrast agent frames satisfying the orientation and distance criteria based on the marker comparison are used for selecting the contrast agent reference frame. The probability along the Gaussian at which the markers from the contrast frame based on centering the Gaussian using the non-contrast reference frame are determined. The contrast frame with the greater probability sum for the two markers is selected as the contrast agent reference frame. Alternatively, once the algorithm is able to find a contrast frame where the detected balloon markers are consistent with those detected in contrast-free frames, the process stops searching and picks the current frame as the reference contrast frame.

In act 54, the reference contrast frame of data is aligned with at least one of the frames of data. For example, the selected contrast frame is aligned to the non-contrast reference frame. Alternatively, the alignment is to one of the output images in acts 36 or 44 or to other contrast frames.

The alignment is the same or different than in acts 34 and 42. For example, since two balloon markers on the non-contrast reference frame as well as the selected contrast frame are detected, the two frames are aligned rigidly by the corresponding balloon markers. Rigid alignment may involve 5 parameters, $t_x, t_y, s_x, s_y, \theta$. Let $M_1^r, M_2^r, M_1^c, M_2^c$ be the first and second balloon markers in the two images, and $\vec{V}^r=(M_1^r-M_2^r)$, and $\vec{V}^c=(M_1^c-M_2^c)$ be the vector of the two balloon markers on the reference frame and the contrast frame, respectively. The 5 parameters can be calculated by:

$(t_x, t_y)=M_1^r(x, y)-M_1^c(x, y)$; $s_x=s_y=|\vec{V}^r|/|\vec{V}^c|$; and $$\theta = \mathrm{acos}\left(\frac{\vec{V}^c \cdot \vec{V}^r}{|\vec{V}^c||\vec{V}^r|}\right).$$

The contrast frame is transformed and aligned to the reference frame.

In act 56, a vessel image is output. The vessel image is the reference contrast frame after alignment. Alternatively, the vessel image is the contrast frame combined with or overlaid over the non-contrast reference frame or another image. FIG. 10*d* represents the reference contrast frame.

One or more vessel walls are detected from at least one of the images identified as including contrast agent, such as the vessel image output in act 56. For example, the vessel walls adjacent to and/or extending beyond the stent are detected in the reference contrast frame of data.

In act 58, a center line of the vessel is determined. Region growing, border detection, spline fitting, skeletonizing, or other processes may be used to identify the center line of the vessel, at least in the region of the stent.

Figure 8A:
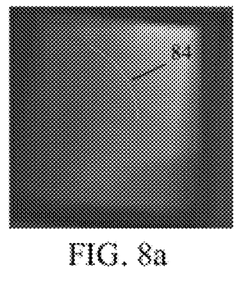
FIGS. 8a-c show an example sequence for guide wire detection used for vessel center line determination.

In one example, the guide wire is used to determine the center line. The guide wire is detected from an image, such as the non-contrast agent reference image. Any process may be used, such as steerable filters or other filters adapted to highlight long curved, thin structures. In one embodiment, a machine-trained guide wire detector is applied. The machine learnt classifier automatically detects the guide wire as a spline curve on the averaged image (e.g., stent enhanced image) output in act 44. The averaged image contains information of the balloon markers, as well as the stent. The guide wire portion is close to the markers. The guide wire detector may mostly pick up the guide wire segment in between the two balloon markers and some portion outside of the two balloon markers. FIG. 8*a* shows an image of a vessel and a detected guide wire 84.

Figure 8B:
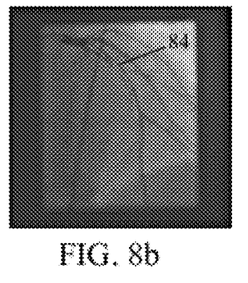

The vessel near the guide wire is detected. For example, the vessel detection used in act 22 is reused. Alternatively, the output vessel information from the contrast reference frame or other contrast frame is used. FIG. 8*b* shows the detected guide wire 84 of FIG. 8*a* overlaid on the reference contrast image. The vessel information may be limited in extent to a region around the stent, such as delineated by the detected markers for the frame of data. The vessel between the markers and extending a given distance past the markers may be identified. A segment of the vessel around the stent is identified.

A probabilistic map indicating a likelihood of locations being in a vessel is formed. The output image from the vessel detection in act 22 includes scores for the segmented portion of the vessel. The scores may be used. In one embodiment, the scores are smoothed, such as by applying a Gaussian smoothing function.

The center line of the vessel is determined from the detected guide wire using the probabilistic map. The locations for the detected guide wire are deformed as a function of the probabilistic map. The detected guide wire is used as a prior. A number of points along the guide wire are sampled. For example, the guide wire locations are sampled every 1 mm along the segmented or stent related portion (e.g., 10 mm portion) of the guide wire. Other sampling distances and guide wire segment lengths may be used.

Figure 8C:
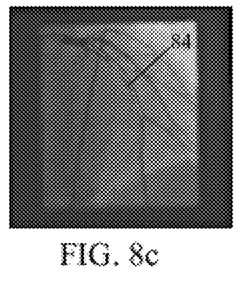

The guide wire is deformed by moving each sample point along a direction normal to the guide wire. The offset along the normal is to position the sample location at the maximal value based on the probabilistic map. By offsetting each sample location, a spline curve is formed. This deformed spline curve is the vessel centerline. FIG. 8*c* shows the centerline or deformed guide wire 84. Unlike FIG. 8*b*, the bottom of the guide wire has been shifted to be within the vessel in FIG. 8*c*.

In act 60, one or more vessel borders are determined. The vessel borders beside and/or extending from the stent are found. The markers may be used to determine the region in which the vessel is to be found. Alternatively or additionally, the extracted guide wire segment may be used to determine the extent of the vessel region to be detected.

Any border detection may be used. The center line output from act 58 is used to determine the borders. For example, region growing from seeds is used. As another example, gradients are applied. Starting from the guide wire, a gradient pattern in directions normal to the guide wire matching a vessel border is identified. In another example, a vessel template is warped based on the curvature of the guide wire. The warped template is then correlated and/or transformed to the contrast agent frame to determine the vessel borders. Other now known or later developed segmentation algorithms using or not using the center line information may be used.

In one embodiment, a cost function is applied to the probabilistic map with the deformed locations of the guide wire as a positive seed. The probabilistic map used for deforming the guide wire may be used. Alternatively, another probabilistic map is used, such as the output of the vessel detector without or with different smoothing. The application of the cost function to the probabilistic map outputs locations of the vessel wall.

The cost function is any cost function, such as a spring, elastic, or other function. In one embodiment, the cost function is a graph-cut algorithm. Segmentation may be formulated as a labeling problem, where every pixel is labeled as either foreground or background. Because there are spatial correlations among neighboring pixels in an image, markov random fields (MRFs) are used to describe these correlations. Based on MRF theory, an image is segmented by labeling its pixels to minimize an energy function:

$$E(\{l\}) = \sum_u D(l_u) + \sum_{(u,v)} V(l_u, l_v)$$

where u is a pixel index. $I_u \in \{0, 1\}$ is the label at pixel u. Iu=0 means u is a background pixel and Iu=1 means u is foreground. D(Iu) is a data cost function describing the cost of labeling pixel u with label Iu. (u, v) is an edge in an eight-connected image grid. V(Iu, Iv) is a discontinuity cost function describing the cost of labeling two neighboring pixels u and v with label Iu and Iv respectively. {I} is a set of all pixel labels, and E({I}) is its total cost. This function is minimized using the graph cut segmentation algorithm, where the function is formulated as a max-flow problem on a graph, and a global minimum solution is the min-cut between the source and the sink in the graph.

For graph cut segmentation, the cost function is defined to enable correct segmentation. Knowing the centerline of the vessel, the image region near the vessel is partitioned to three regions: a foreground region, a background region, and an unknown region. The foreground region has high probability of being included in the vessel and the background region has high probability of being outside of the vessel. It is uncertain whether a pixel in the unknown region belongs to foreground or background. A data cost function may be defined based on the partition:

$$\begin{cases} D(l_u = 0) = +\infty & D(l_u = 1) = -\infty & \text{if } u \in \text{ Foreground} \\ D(l_u = 0) = -\infty & D(l_u = 1) = +\infty & \text{if } u \in \text{ Background} \\ D(l_u = 0) = 0 & D(l_u = 1) = 0 & \text{if } u \in \text{ Unknown} \end{cases}$$

where a large penalty is given when a foreground pixel is labeled as background or vice versa. This gives a hard constraint on the pixels in the foreground and background region. The data cost is zero in the unknown region.

An empirical way to determine the discontinuity cost is to assume that the two pixels on an edge should have large intensity difference if one of them belongs to foreground and another belongs to background. A discontinuity cost may be defined as:

$$\begin{cases} V(l_u, l_v) = 0 & \text{if } l_u = l_v \\ V(l_u, l_v) = \exp\left(-\frac{(I_u - I_v)^2}{2\sigma^2}\right)\frac{1}{dist(u, v)} & \text{otherwise} \end{cases}$$

where Iu and Iv are image intensities of pixel u and v. σ is a constant. dist(u, v) is the length of the edge (u, v). This discontinuity cost gives a large penalty when the two pixels with similar intensities are labeled differently.

Figure 9A:
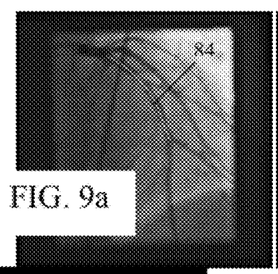
FIGS. 9a-c show use of the guide wire information of FIG. 8c as positive and negative seeds in one vessel segmentation example.
Figure 9B:
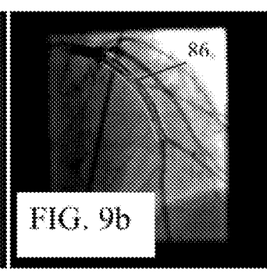

To segment the vessel border, the obtained vessel centerline is used as a positive seed. From each positive seed, +20 mm, and −20 mm along the normal direction are used as negative seeds. FIG. 9a shows the centerline 84 as the positive seed. FIG. 9b shows two negative seeds 86 spaced from the centerline on each side by 20 mm. Other distances or numbers of negative seeds may be used. The negative seeds are labeled as background. The centerline is labeled as foreground. The region in between the seeds is labeled as unknown.

Figure 9C:
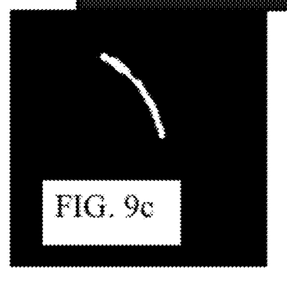

The graph cut algorithm is applied with the positive and negative seeds to get the segmented vessel. The cost is determined for each unknown location. Where the cost is low, the location is labeled vessel. Where the cost is high, the location is labeled as background or not vessel border. FIG. 9c shows the segmented region where white includes locations labeled as vessel based on the cost. The segment may be smoothed, such as applying a low pass filter to the data and/or along the outer edges of the segment.

To determine the border, the long sides of the segmented region are identified. The locations associated with the identified borders may be used to generate a graphic overlay or to enhance the border in the image.

In act 62, an image with the border is output. FIG. 10e shows a graphic overlay for the vessel border on the reference contrast image of FIG. 10d. The border may alternatively or additionally be placed on a stent image, such as the enhanced stent images of FIG. 10b or c. An image representing the stent and including a highlight of the vessel wall is provided. The highlight is through enhancement, mapping (e.g., mapping vessel information to one color and stent information to another color or gray scale, or vice versa), or graphic overlay. The highlight is aligned with the stent based on the aligning of the markers. The image of the stent is generated from the fluoroscopy imaging sequence with the vessel wall enhanced relative to background. The background image may be formed from multiple images compounded together or from just one of the non-contrast or contrast frames.

The images of FIGS. 10b-e and/or the images output in acts 36, 44, 56, and/or 62 may be generated based on an input sequence of images without user indication of any location in the images. A user seed location, such as to indicate the stent, vessel, vessel wall, center line, guide wire, or segment, is not provided. The user may input settings for the process, such as tolerances, weights, or availability (e.g., whether ECG is available or not), but the process generates an enhanced stent image and/or vessel border image free of locational input. The user activates the process, but does not assist the process in segmenting, aligning, detection, deforming or any of the other acts 22-62. FIGS. 10b, c, d, and e are generated given a sequence of input images, such as the image in FIG. 10a, as the only input.

Figure 11:
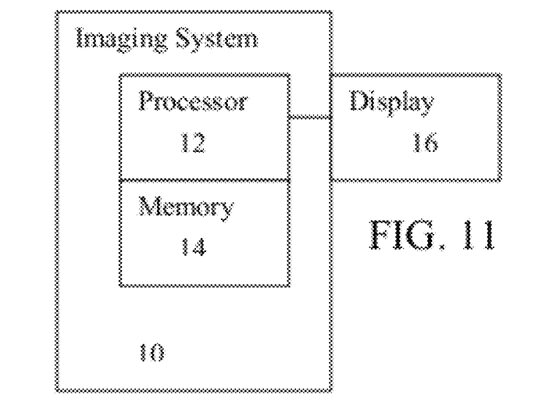
FIG. 11 is a block diagram of one embodiment of a system for stent viewing.

FIG. 11 shows a medical diagnostic imaging system 10 for stent enhancement in medical imaging. The system 10 is a medical fluoroscopy imaging system, but may be a computer, workstation, database, server, or other system. The system 10 includes a processor 12, a memory 14, and a display 16. Additional, different, or fewer components may be provided. For example, the system 10 includes an x-ray source and detector.

The memory 14 is a buffer, cache, RAM, removable media, hard drive, magnetic, optical, database, or other now known or later developed memory. The memory 14 is a single device or group of two or more devices. The memory 14 is shown within the system 10, but may be outside or remote from other components of the system 10, such as a database or PACS memory.

The memory 14 stores medical imaging data. For example, a fluoroscopy sequence of images is stored. The sequence is acquired over seconds or minutes. During the sequence, contrast agents may be introduced into the scanned region. As a result, some of the images represent contrast agents and some do not. The medical images are of a region including a vessel and a stent. The stent may be introduced during acquisition of the sequence or may already be in place during the acquisition. The vessel may or may not include a guide wire for placement of the stent. Other types of medical images may be stored. Alternatively, the medical image data is transferred to the processor 12 from another device with or without storage in the memory 14.

For real-time imaging, the medical data bypasses the memory 14, is temporarily stored in the memory 14, or is loaded from the memory 14. Real-time imaging may allow delay of a fraction of seconds, or even seconds, between acquisition of data and imaging. For example, real-time imaging is provided by generating images of the sequence substantially simultaneously with the acquisition of the data by scanning. To allow better visualization of the stent, especially stents with less metal or radio opaque materials, an enhanced stent image may be generated. A preview image may be provided for more rapid presentation to the viewer. Alternatively or additionally, an enhanced stent image, reference contrast image, vessel highlighted image, or combinations thereof are generated with a delay, such as from several seconds to minutes, after acquisition of the sequence. In alternative embodiments, the image data is stored in the memory 14 from a previous imaging session and used for generating the vessel highlighted or stent enhanced images without concurrent acquisition.

The memory 14 is additionally or alternatively a computer readable storage medium with processing instructions. The memory 14 stores data representing instructions executable by the programmed processor 12 for stent viewing (enhancement and/or vessel detection) in medical imaging of a stent. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 12 is a general processor, digital signal processor, graphics processing unit, application specific integrated circuit, field programmable gate array, digital circuit, analog circuit, combinations thereof, or other now known or later developed device for processing frames of data for medical images. The processor 12 is a single device, a plurality of devices, or a network. For more than one device, parallel or sequential division of processing may be used. Different devices making up the processor 12 may perform different functions, such as an automated anatomy detector and a separate device for performing measurements associated with the detected anatomy. In one embodiment, the processor 12 is a control processor or other processor of a medical diagnostic imaging system, such as a fluoroscopy imaging system processor. The processor 12 operates pursuant to stored instructions to perform various acts described herein, such as obtaining data, detecting contrast agents, aligning frames of data, generating a stent enhancement image, detecting vessel borders, and/or generating a vessel image.

The processor 12 performs machine learning and/or applies a machine-learnt algorithm. For example, the processor 12 applies a probabilistic model to detect contrast agent, detect markers, identify a vessel center line (e.g., detect guide wire), and/or detect a vessel boundary. The probabilistic model is a machine-learned classifier. Any classifier may be applied, such as a model-based classifier or a learned classifier (e.g., classifier based on machine learning). For learned classifiers, binary or multi-class classifiers may be used, such as Bayesian or neural network classifiers. In one embodiment, a PBT classifier is used. The classifier is instructions, a matrix, a learned code, or other software and/or hardware for distinguishing between information in a medical image.

The classifier may include a plurality of models or classifiers (e.g., detectors) operable together or independently. For example, different probabilistic models are trained for different processes, such as one for detecting contrast agent and another for detecting markers. The probabilistic models may be joint or dependent.

In another example of a plurality of classifiers being used as one, different probabilistic models are trained for different scales. A data pyramid is provided, such as the same data set down sampled to different resolutions or at different scales. Two or more versions or scales of the data may be provided. Different probabilistic models are provided as classifiers for each of the data sets. One classifier is applied to the coarsest set. The results of the course set application are used by the classifier for the next highest resolution, such as by limiting the search space. This repeats until the highest resolution data set is used. In alternative embodiments, a single data set is used.

The different classifiers are the same or different types of classifiers. The same or different types of classifiers may be used for the same type of classification, such as different types of classifiers being used for different scales.

In one embodiment, the probabilistic model is formed from a probabilistic boosting tree classifier. For example, the classifiers are trained using Haar wavelet features. Haar waveletlike features represent the difference between different portions of a region. Any number of features may be used, such as tens, hundreds, or thousands. Other features may be used, such as steerable features.

For application, the processor 12 calculates features for classification. The features may be for sub-sets of the frames, such as for a plurality of image patches centered on ridge locations. The processor 12 may apply other processes, such as aligning or other acts using the output of the machine-learnt classifiers or not using such output.

The processor 12 is configured to perform any or all of the acts of FIG. 1. For example, the processor 12 detects the vessel from the medical data. A probabilistic map is formed, such as output scores from a machine-trained classifier. The map indicates a likelihood of locations being in the vessel or not. The processor 12 also determines a center line for the vessel. The center line is determined based on a guide wire, contrast agent data, or other information. The guide wire is detected.

The processor 12 locates the vessel boundary by deforming locations for the detected guide wire as a function of the probabilistic map. A cost function is applied to the probabilistic map with the deformed locations of the guide wire as a positive seed. The application of the cost function results in identification of the locations of the vessel boundary.

As another example, the processor 12 identifies stent markers and/or aligns images. The alignment may be of the detected vessel boundary with the stent. The alignment uses the stent markers to determine translation, rotation, and/or scale for alignment.

In another example, the processor 12 generates an image. A contrast image, stent enhanced image, vessel segment image, or combinations thereof is output. The vessel segment image includes or does not include the enhanced stent information. The vessel boundary may be highlighted, such as the adjusting the gray scale or color or by graphic overlay.

The display 16 is a CRT, LCD, plasma, projector, printer, or other output device for showing an image. The display 16 displays an image, such as one or more of the images shown in FIGS. 10a-e. A stent enhanced image, a contrast reference image, a preview image, a vessel boundary image or combinations thereof. The combinations may be multiple images shown separately on the same or adjacent displays at the same time. The combinations may be two or more images compounded (e.g., averaged) together to form one image on the display 16.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for stent viewing in medical imaging, the method comprising:
   identifying from a plurality of frames of data a first sub-set of frames of data representing contrast agents, the frames of data representing a patient at different times during inflow of the contrast agent such that the first sub-set the frames of data represent the contrast agent and a second sub-set of the frames of data are free of contrast agent;
   detecting markers for a stent in at least some of the frames of data;
   selecting a reference contrast frame of data from the first sub-set of the frames of data, the reference contrast frame of data selected as a function of detected markers for the stent;
   detecting a vessel wall in the reference contrast frame of data;
   aligning the reference contrast frame of data with a stent output; and
   outputting an image representing the stent, the image including a highlight of the vessel wall, the highlight aligned with the stent based on the aligning.

2. The method of claim 1 wherein identifying comprises identifying with a machine-trained classifier.

3. The method of claim 1 wherein identifying comprises:
   determining, for locations represented by the frames of data, a score for each of the locations, the score based on whether the location is inside a vessel;
   summing the scores for each of the frames of data; and
   correlating a kernel representing in-flow with a plot of the summed scores as a function of relative time of the frames of data, the kernel representing the in-flow having an initial portion corresponding to no contrast agents.

4. The method of claim 1 further comprising:
   selecting a third sub-set of the frames of data as a function of an ECG such that the third sub-set corresponds to low cardiac motion; and
   outputting a pre-view image as a function of the third sub-set.

5. The method of claim 1 wherein detecting the markers comprises:
   selecting a marker reference frame of data from the frames of data, the selecting being as a function of a distance between markers in the frames of data and probabilities of the markers in the frames being correct.

6. The method of claim 1 further comprising:
   aligning at least some of the frames of data as a function of the markers;
   combining the aligned at least some of the frames of data into a stent frame of data, the stent frame of data comprising the stent output; and
   outputting a stent image as a function of the stent frame of data.

7. The method of claim 1 wherein aligning comprises rigidly transforming.

8. The method of claim 1 wherein detecting the vessel wall comprises:
   detecting a guide wire;
   forming a probabilistic map indicating a likelihood of locations being in a vessel;
   deforming locations for the detected guide wire as a function of the probabilistic map; and
   applying a cost function to the probabilistic map with the deformed locations of the guide wire as a positive seed, the application outputting locations of the vessel wall.

9. In a non-transitory computer readable storage medium having stored therein data representing instructions executable by a programmed processor for stent viewing in medical imaging, the storage medium comprising instructions for:
   identifying images representing contrast agents with a machine-trained classifier from a fluoroscopy imaging sequence;
   detecting a vessel wall from at least one of the identified images; and
   generating an image of a stent from the fluoroscopy imaging sequence with the vessel wall enhanced relative to background.

10. The non-transitory computer readable storage medium of claim 9 wherein identifying comprises:
  determining, for locations represented by the images, a score for each of the locations, the score based on whether the location is inside a vessel and an output of the machine-trained classifier;
  summing the scores for each of the images; and
  correlating a kernel representing in-flow with a plot of the summed scores as a function of relative time of the images, the kernel representing the in-flow having an initial portion corresponding to no contrast agents.

11. The non-transitory computer readable storage medium of claim 9 wherein identifying comprises identifying an image corresponding to a beginning of in-flow of contrast agents in the fluoroscopy sequence.

12. The non-transitory computer readable storage medium of claim 9 wherein identifying comprises:
  scaling the images to different scale levels;
  for each scale level, applying steerable filters, the steerable filters enhancing ridges in the scaled images; and
  classifying points along a ridge as being part of a vessel or not part of a vessel.

13. The non-transitory computer readable storage medium of claim 9 wherein generating comprises generating the image with a graphic overlay for the vessel wall.

14. The non-transitory computer readable storage medium of claim 9 further comprising:
  detecting markers for the stent;
  aligning the images as a function of the markers; and
  compounding the aligned images;
  wherein the image is generated as a function of the compounded images and includes a graphic overlay for the vessel wall.

15. The non-transitory computer readable storage medium of claim 9 wherein detecting the vessel wall comprises:
  locating a center line of the vessel; and
  determining vessel borders as a function of the center line;
  wherein the locating and determining the vessel borders are performed without user indication of any location in the images.

16. A system for stent viewing in medical imaging, the system comprising:
  a memory operable to store data representing a vessel with contrast agent and a guide wire for a stent;
  a processor configured to detect the vessel from the data by forming a probabilistic map indicating a likelihood of locations being in the vessel using a machine-trained classifier, determine a center line for the vessel from the guide wire, locate a vessel boundary from the vessel and the centerline, and generate an image from the data, the image highlighting the vessel boundary; and
  a display operable to display the image.

17. The system of claim 16 wherein the processor is configured to determine the center line from the guide wire by detecting a guide wire and to locate the vessel boundary by deforming locations for the detected guide wire as a function of the probabilistic map and by applying a cost function to the probabilistic map with the deformed locations of the guide wire as a positive seed, the application outputting locations of the vessel boundary.

18. The system of claim 16 wherein the processor is configured to identify stent markers and align the vessel boundary with the stent as a function of the stent markers.

19. The system of claim 16 wherein the processor is configured to apply learning-based classifiers to detect balloon markers, the vessel boundary, and the guide wire.

* * * * *